No. 723,370. PATENTED MAR. 24, 1903.
D. C. DEMAREST.
STOPPER FOR BOTTLES OR THE LIKE.
APPLICATION FILED AUG. 6, 1902.
NO MODEL.
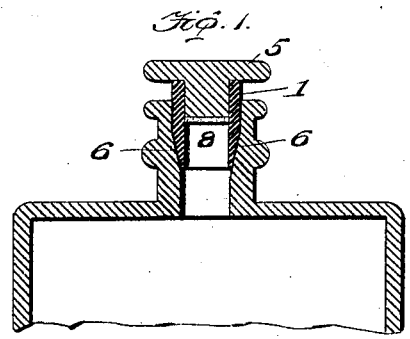
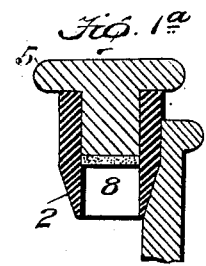
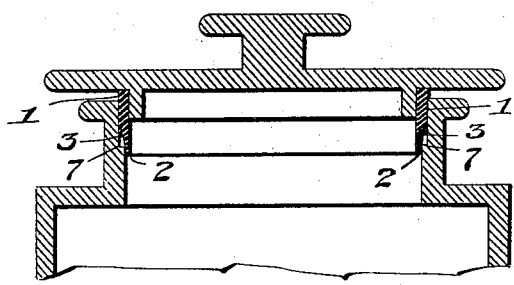
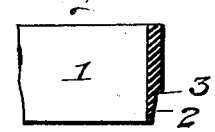
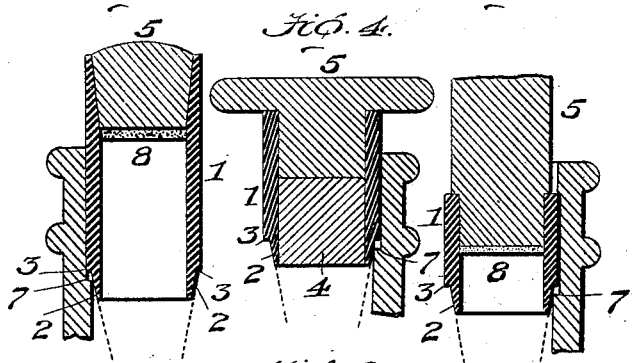
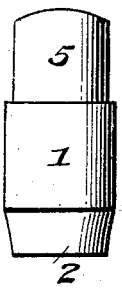
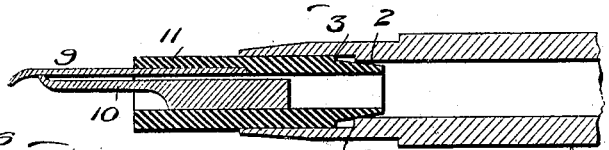
Witnesses
Inventor
Dewitt C. Demarest
By Johnson & Johnson
Attys.

UNITED STATES PATENT OFFICE.

DEWITT C. DEMAREST, OF PASSAIC, NEW JERSEY.

STOPPER FOR BOTTLES OR THE LIKE.

SPECIFICATION forming part of Letters Patent No. 723,370, dated March 24, 1903.

Application filed August 6, 1902. Serial No. 118,672. (No model.)

*To all whom it may concern:*

Be it known that I, DEWITT C. DEMAREST, a citizen of the United States, residing at Passaic, in the county of Passaic and State of New Jersey, have invented certain new and useful Improvements in Stoppers for Bottles or the Like, of which the following is a specification.

I have produced a stopper of hard rubber of tubular or shell form designed for use with bottles and with the chambered barrel of a fountain-pen; and the object of my improvement is to provide an inelastic tube that will give a comparatively small air-tight sealing-joint at its end only with the walls of the closure and to render it easy to seat and to remove the stopper by reason of the smallness of the joint forming the surface as compared with elastic stoppers which form the sealing-joint by expansion, as illustrated in the accompanying drawings, and in the claims appended hereto I will point out the parts and combination of parts which constitute my improvement.

Referring to the drawings, Figure 1 shows in section the neck portion of a bottle and a tubular rubber stopper embodying my improvement. Fig. 1ª shows the tubular stopper with a tapering end without shoulder. Fig. 2 is a like view of a jar with a cover provided with my tubular rubber or ring stopper. Fig. 2ª is a detail of the shouldered ring-stopper shown in Fig. 2. Figs. 3, 4, and 5 show in section different forms of my tubular or shell rubber stopper with end plugs. Fig. 6 shows my tubular or ring rubber stopper as applied to the barrel of a fountain-pen in place of the usual screw-plug. Fig. 7 shows my tubular or shell rubber stopper with a tapering seating end.

I produce the stopper in the form of a tube or shell of hard rubber 1, open at both ends, and in this form it is produced in a tubing-machine. The tube of proper length and diameter has its stopper-forming end 2 made tapering, the base of the cone preferably terminating in an annular shoulder 3. This rubber tube or shell while having comparatively thin walls is strong enough to resist any external crushing force necessary to seat it within and upon the neck-wall. I may, however, fill or close the tubular sealing end of the stopper with a plug of cork 4 or other suitable material secured by cement, as in Fig. 4. At its outer end the tube is provided with a head-plug 5, which may or may not have a head, as in Figs. 3 and 4. This head-plug may be of cork, wood, glass, rubber, paper, or of earthenware and is cemented as a fixed part of the hard-rubber tubular stopper. As in Fig. 3, this head-plug may be seated on outward-flaring walls of the tube, or, as in Fig. 5, the head-plug may be seated by a shoulder on the end of the tube, or, as in Fig. 4, the two end plugs may abut within the tube.

While I prefer forming the tapering end with a shoulder 3, the tapering sealing end 2 may be formed without the shoulder, as in Figs. 1, 1ª, and 7.

The inner walls of the bottle-neck may be formed with a tapering seat 6, corresponding with the tapering end 2 of the tubular stopper, and on the tapering-neck seating-walls the tubular end of the stopper makes the perfect seal without a shoulder, as in Fig. 1. Preferably, however, I form the inner walls of the neck with a shoulder 7, corresponding with the shoulder 3 of the tubular rubber stopper, and when so formed the neck-walls are parallel at their junction with the shoulder, and the tapering walls of the tubular stopper will in such case be seated on the neck-shoulder, as in Figs. 2, 3, 4, 5, and 6, and form the seal. In either case the seal is made by the tapering end of the rubber shell holding it tightly upon the neck wall or shoulder of the closure. It is the tapering end of the tube which wedges on the wall-shoulder that makes the sealing-joint air-tight. For this purpose the tapering end of the rubber tube is turned by a tool or smoothed by sand-paper to give it a good grip and wedge action on the walls of the closure and at the same time prevent sticking and allow it to be readily opened.

As the stopper-plugs of wood are not air-tight and are more or less porous and would be objectionable to use them with some fluids, I provide an internal facing of wax 8 or other suitable insulator fixed on the inner end of the head-plugs, as in Figs. 1, 1ª, 3, and 5. In using the wax to shield the contact of the head-plug from the fluid the sealing end of the tube will be open.

The walls of the rubber tube are reasonably thick to allow it to be formed with the shouldered tapering end that will stand the required sealing pressure.

In seating the stopper it is not intended that the shoulder of the rubber tube should abut with the shoulder of the closure-wall, but that the seating-joint and the sealing are formed by the tapering end of the stopper upon the closure-wall shoulder, so that the seal is practically formed by an edge contact made by tapering and parallel walls, and while this is the preferred construction, because it gives an effective quick sealing and easy loosening of the stopper, yet a rubber tube having one end formed tapering, its other end provided with a head-plug to form a stopper, is effective as such without a shoulder.

The head-plug extends a sufficient distance within the tube to give it a firm hold therein and being cemented renders it practically a solid part of the tubular stopper.

Looking at Fig. 6 is seen an illustration of my tubular rubber stopper as it is used for closing the open end of the barrel of a fountain-pen, in which 9 is the pen, 10 the pen-holding plug, and 11 the tubular plug-section, which in fountain-pens has an external screw-thread which engages a screw on the inner walls of the barrel to close and seal the fountain or chamber thereof as a stopper and which serves as a stopper and is removed to supply the chamber with ink and through which the ink is fed to the pen. To the inner end of this tubular plug-stopper and to the inner walls of the barrel I apply my stopper improvement to take the place of the sealing screw-stopper. The inner end of this tubular plug is made tapering, with a shoulder 3 at the base of the cone, and the inner wall of the barrel is formed with a shoulder 7, like that in the neck of the bottle, and when the tubular plug is inserted in the barrel its conical end wedges on the shoulder thereof and binds it in place, sealing the chamber of the barrel. In this construction there is the combination of the same stopper-forming elements as is shown in the neck of a bottle or jar to form an air-tight joint. When the neck or chamber walls are formed with shoulders, the walls which join the shoulder are parallel, and the shoulder is sharply formed by making the walls of greater diameter at the open end of the neck or chamber, and it will be understood that the shoulder or tapering seat is formed a sufficient distance within the opening to receive that part of the stopper between the shoulder and its outer end to afford protection to the stopper against accidental displacement.

In Figs. 1 and 1ª the tapering end of the tubular stopper is seen formed with straight walls, while in Fig. 7 the conical walls are concave.

The production of a tube of hard rubber of indefinite length is cut into proper lengths, and these are then turned with the tapering end and shoulder to form the stopper.

It is important to note that the walls of the head-plug are smooth and its cementing within the tube renders its interior air-tight, while the plug at the other end of the tube forms a solid support for the thin walls of the tapered end of the tube, where the tight joint is made. These plugs are especially important in their function of giving solidity to the inelastic walls of the hard-rubber tube. I make the two plugs separate to allow the use of different materials for each plug, as stated.

I claim—

1. A stopper formed of an inelastic rubber tube or shell and a plug of smooth walls cemented in one end, the other end of the tube tapered and adapted to form the sealing-joint with the walls of the closure.

2. A stopper formed of an inelastic rubber tube or shell and a plug of smooth walls cemented in one end and the other end of the tube terminating in an annular shoulder and a taper joining said shoulder to form the sealing-joint with the walls of the closure.

3. A stopper formed of an inelastic rubber tube or shell one end terminating in an annular shoulder and a taper joining said shoulder to form the sealing-joint with the closure-wall, a plug cemented in the other end of the tube and a facing or cover for the inner end of the plug for insulating it from the contents of the bottle.

4. In a bottle-stopper and in combination with a bottle or the like having the inner walls of its opening formed with an annular shoulder, a stopper of an inelastic tube or shell one end terminating in an annular shoulder and a taper joining said shoulder to form a sealing-joint with the closure-shoulder, and a plug cemented in the outer end of said tube.

In testimony whereof I affix my signature in presence of two witnesses.

DEWITT C. DEMAREST.

Witnesses:
 DANL. J. DUNPHY,
 I. L. H. MERIKEL.